(12) United States Patent  
Fan et al.

(10) Patent No.: US 7,418,455 B2
(45) Date of Patent: Aug. 26, 2008

(54) SYSTEM AND METHOD FOR INDEXING WEIGHTED-SEQUENCES IN LARGE DATABASES

(75) Inventors: Wei Fan, New York, NY (US); Chang-Shing Perng, Bedford Hills, NY (US); Haixun Wang, Tarrytown, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/723,229

(22) Filed: Nov. 26, 2003

(65) Prior Publication Data

US 2005/0114298 A1 May 26, 2005

(51) Int. Cl.
*G06F 7/00* (2006.01)
*G06F 17/00* (2006.01)
(52) U.S. Cl. .................................... 707/102
(58) Field of Classification Search ................ None
See application file for complete search history.

(56) References Cited

OTHER PUBLICATIONS

H. Wang, C. Perng, W Fan, S Park, P Yu. "Indexing Weighted-Sequences in Large Dataase" ICDE'03 Mar. 5-8, 2003 pp. 63-74.*
Haixun Wang Resume, as archived Mar. 21, 2003.*
IEEE Reliability Society, www.IEEE.org p. 3. Apr. 3, 2007.*
IEEE Publication Services and Products Board Operations Manual pp. 1-78. Feb. 15, 2002, Amended Nov. 19, 2006.*
Wang et al. "An index structure for pattern similarity searching in DNA microarray data" Bioinformatics Conference 2002, Aug. 2002 pp. 256-267.*

* cited by examiner

*Primary Examiner*—Charles Rones
*Assistant Examiner*—Jacob F Betit
(74) *Attorney, Agent, or Firm*—F. Chau & Associates, LLC (57) ABSTRACT

The present invention provides an index structure for managing weighted-sequences in large databases. A weighted-sequence is defined as a two-dimensional structure in which each element in the sequence is associated with a weight. A series of network events, for instance, is a weighted-sequence because each event is associated with a timestamp. Querying a large sequence database by events' occurrence patterns is a first step towards understanding the temporal causal relationships among the events. The index structure proposed herein enables the efficient retrieval from the database of all subsequences (contiguous and non-contiguous) that match a given query sequence both by events and by weights. The index structure also takes into consideration the nonuniform frequency distribution of events in the sequence data.

16 Claims, 3 Drawing Sheets

SYSTEM AND METHOD FOR INDEXING WEIGHTED-SEQUENCES IN LARGE DATABASES

BACKGROUND OF THE INVENTION

1. Field of the Invention

The present invention relates to databases and, more particularly, to indexing weighted-sequences in large databases.

2. Description of the Related Art

Fast sequence indexing is essential to many applications, including time series analysis, multimedia database management, network intrusion detection, and the like. Recently, the field of molecular genetics has received increasing attention and is widely recognized as being one of the key technologies today.

Consider a domain of event management for complex networks where events or messages are generated when special conditions arise. Each event, as well as the environment in which it occurs, is logged into a database. Given a large data set of event sequences, a typical type of query (i.e., an event sequence match) is illustrated

| Event | Timestamp |
|---|---|
| . | . |
| . | . |
| . | . |
| CiscoDCDLinkUp | 19:08:01 |
| MLMSocketClose | 19:08:07 |
| MLMStatusUp | 19:08:21 |
| . | . |
| . | . |
| MiddleLayerManagerUp | 19:08:37 |
| CiscoDCDLinkUp | 19:08:39 |
| . | . |
| . | . |
| . | . |

Among other possible attributes of the data set (e.g., Host, Severity, etc.), the attributes Event and Timestamp are shown. The event sequence match shown above can result from the following query: Find all occurrences of CiscoDCDLinkUp that are followed by MLMStatusUp that are followed, in turn, by CiscoDCDLinkUp, under the constraint that the interval between the first two events is 20±2 seconds, and the interval between the 1st and 3rd events is 40±3 seconds. Answering such queries efficiently is important to understanding temporal causal relationships among events, which often provide actionable insights for determining problems in system management.

A query can involve any number of events, and each event has an approximate weight, which, as described herein, is the elapsed time between the occurrence of the event and the occurrence of the first event (CiscoDCDLinkUp) in the query sequence. There are generally two characteristic issues in event sequences (i.e., the weighted-sequence problem): (1) In real life datasets, more often than not, certain events occur more frequently than others (this may affect query performance); and (2) It is unlikely that two causally related events are separated by a very large time gap. Currently known solutions do not address the weighted-sequence problem.

There has been much research on indexing substrings. A suffix tree, for example, is a very useful data structure that embodies a compact index to all the distinct, non-empty substrings of a given string. The suffix tree is described in greater detail in E. M. McCreight. A space-economical suffix tree construction algorithm, *Journal of the ACM*, 23(2):262-272, April 1976.

The suffix tree, however, is not adequate to solve the problems event sequence matching, as described above, because it only provides fast accesses for searching contiguous subsequences in a string database. More specifically, in string matching, the relative positions of two elements in a string is also used to embody the distance between them, while in the example provided above, the distance between two elements is expressed explicitly by another dimension (i.e., the weight).

Similarity based subsequence matching has been a research focus for applications such as time series databases. Similarity based subsequence matching is described in greater detail in C. Faloutsos, M. Ranganathan, and Y. Manolopoulos. Fast subsequence matching in time-series databases, In *SIGMOD*, pages 419-429, 1994. The basic idea is to map each data sequence into a small set of multidimensional rectangles in the feature space. Traditional spatial access methods (e.g., R-tree) are then used to index and retrieve these rectangles. Here, retrieval is based on similarity of the time-series within a continuous time interval. The method cannot be applied to solve the weighted-sequence problem because the pattern to retrieve is usually a non-contiguous subsequence in the original sequence.

Recently, the problem of exact matching for multidimensional strings has been addressed in H. V. Jagadish, N. Koudas, and D. Srivastava, On effective multi-dimensional indexing for strings, In *SIGMOD*, pages 403-414, 2000. Strings are mapped to real numbers based on their lexical order. Then these multidimensional points are indexed using R-trees. This technique works efficiently for queries such as "find a person whose name begins with Sri and telephone number begins with 973". However, this technique does not address how to find objects that match a given pattern instead of exact values.

There has been little research in fast retrieval of numerical patterns in relational tables. The techniques described above cannot be applied directly to solve the weighted-sequence problem, largely because they only handle one-dimensional series. On the other hand, much research has been devoted to finding frequent patterns in large database (e.g., Ramakrishnan Srikant and Rakesh Agrawal. Mining generalized association rules. In *VLDB*, Zurich, Switzerland, September 1995.). These methods typically scan a data set multiple times in order to find patterns whose occurrence level is beyond a threshold. That is, finding frequent patterns is a clustering problem, which typically involves scanning the data set again and again to find patterns that occur frequently. Therefore, the complexity of these algorithms is at least O(N). Some are even of exponential complexity.

Accordingly, there exists a need for an efficient solution for searching large databases to find objects that exhibit a given pattern or sequence of events.

SUMMARY OF THE INVENTION

In one aspect of the present invention, a method of generating an index for a sequence that supports a non-contiguous subsequence match is provided. The method comprises receiving a sequence; receiving a window size; encoding the sequence into a weighted-sequence; encoding the weighted sequence into one or more one-dimensional sequences, wherein the length of each of the one or more one-dimensional sequences is less than the window size; and inserting each of the one or more one-dimensional sequences into a trie structure. The method also comprises creating the index, wherein the index comprises: a current sequential ID and a maximum sequential ID pair for each of the one or more trie nodes, wherein the current sequential ID of any descendant of a given trie node is between the current sequential ID of the given trie node and the maximum sequential ID; an iso-depth link for each unique symbol in each of the one or more one-dimensional sequences, wherein the the iso-depth link comprises trie nodes under the symbol; an offset list comprising an original position of each of the one or more subsequences in the weighted-sequence.

In another aspect of the present invention, a method of matching a query sequence in a weighted-sequences index is provided. The method comprises receiving the query sequence; transforming the query sequence into a weighted sequence; and encoding the weighted sequence into one or more one-dimensional sequences. The method also comprises searching one or more iso-depth links of the weighted-sequences index structure using the one or more one-dimensional sequences as follows: (a) assuming the query sequence is $<q\_1, q\_2, \ldots, q\_n>$; (b) assigning i=1, begin=0, end=infinity; (c) finding iso-depth link for q_i; (d) for each label pair (x, y) in the link of q_i such that begin<x<end do: (e) if (i=n) then {returning the offset in the offfset lists of nodes in the range of [x,y]}; (f) if (i<n) then {assigning i=i+1; begin=x, end=y; going to step (c)}.

In yet another aspect of the present invention, a machine-readable medium having instructions stored thereon for execution by a processor to perform a method of generating an index for a sequence that supports a non-contiguous subsequence match is provided. The method comprises receiving a sequence; receiving a window size; encoding the sequence into a weighted-sequence; encoding the weighted sequence into one or more one-dimensional sequences, wherein the length of each of the one or more one-dimensional sequences is less than the window size; and inserting each of the one or more one-dimensional sequences into a trie structure. The method also comprises creating the index, wherein the index comprises: a current sequential ID and a maximum sequential ID pair for each of the one or more trie nodes, wherein the current sequential ID of any descendant of a given trie node is between the current sequential ID of the given trie node and the maximum sequential ID; an iso-depth link for each unique symbol in each of the one or more one-dimensional sequences, wherein the the iso-depth link comprises trie nodes under the symbol; an offset list comprising an original position of each of the one or more subsequences in the weighted-sequence.

In an additional aspect of the present invention, a machine-readable medium having instructions stored thereon for execution by a processor to perform a method of matching a query sequence in a weighted-sequences index is provided. The method comprises receiving the query sequence; transforming the query sequence into a weighted sequence; and encoding the weighted sequence into one or more one-dimensional sequences. The method also comprises searching one or more iso-depth links of the weighted-sequences index structure using the one or more one-dimensional sequences as follows: (a) assuming the query sequence is $<q\_1, q\_2, \ldots, q\_n>$; (b) assigning i=1, begin=0, end=infinity; (c) finding iso-depth link for q_i; (d) for each label pair (x, y) in the link of q_i such that begin<x<end do: (e) if (i=n) then {returning the offset in the offfset lists of nodes in the range of [x,y]}; (f) if (i<n) then {assigning i=i+1; begin=x, end=y; going to step (c)}.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

An index structure for managing weighted-sequences in large databases is presented herein. A weighted-sequence is defined as a two-dimensional structure in which each element in the sequence is associated with a weight. A series of network events, for instance, is a weighted-sequence because each event is associated with a timestamp. Querying a large sequence database by events' occurrence patterns is a first step towards understanding the temporal causal relationships among the events. The index structure proposed herein enables the efficient retrieval from the database of all subsequences (contiguous and non-contiguous) that match a given query sequence both by events and by weights. The index structure also takes into consideration the non-uniform frequency distribution of events in the sequence data.

The terminology used herein will now be defined.

1. Weighted-Sequence

A weighted-sequence is a sequence of (symbol, weight) pairs (in the case, n pairs): $T=\langle(a_1, w_1), (a_2, w_2), \ldots, (a_n, w_n)\rangle$. Here, each $a_i$ is a symbol, and $w_i \in \mathbb{R}$. $\mathbb{R}$ represents the set of real numbers. As defined herein, weighted-sequences comprise weights of ascending order (i.e., $wi \leq wj$ for $i<j$). Event sequences, for instance, are generated with increasing timestamps. As described in greater detail below, numerical tables can be reduced to sequences in the ordered form as well.

The following notations are based on the above definition of the weighted-sequence:

| | |
|---|---|
| T | a weighted-sequence; |
| $T_i$ | the i-th item in sequence T; |
| $s(T_i)$ | symbol of the i-th item in sequence T; |
| $w(T_i)$ | weight of the i-th item in sequence T; |
| A | symbol set, $A = \cup_i \{s(T_i)\}$ |
| \|T\| | length (number of items) of T |
| \|\|T\|\| | weight range of T, $\|T\| = w(T_{|T|}) - w(T_1)$ |
| $T' \subset T$ | T' is a (non-contiguous) subsequence of T |
| ξ | window size |

Note that $\|T\|$ is the weight difference between the first and last elements of T. If T is a timestamped event sequence, then $\|T\|$ is the time span between the first and the last events that compose the sequence, while $|T|$ is the number of events occurred during that period. A subsequence of T, possibly non-contiguous, is derived from T by discarding some of its items. We use $T' \subset T$ to indicate that T' is a non-contiguous subsequence of T. A query sequence $Q=\langle(b_1, 0), \ldots, (b_m, w_m)\rangle$ is a special weighted-sequence in that the weight of the first item in the sequence, $w(Q)$, is 0.

2. Weighted-Sequence Matching

A query sequence Q matches sequence T if there exists a (non-contiguous) subsequence $T' \subset T$ such that $|Q|=|T'|$, $s(Q_i)= s(T'_i)$, and $w(Q_i)=w(T'_i)-w(t'_1), \forall i \in 1, \ldots, |Q|$. This is known as a weighted-sequence matching.

Figure 1:
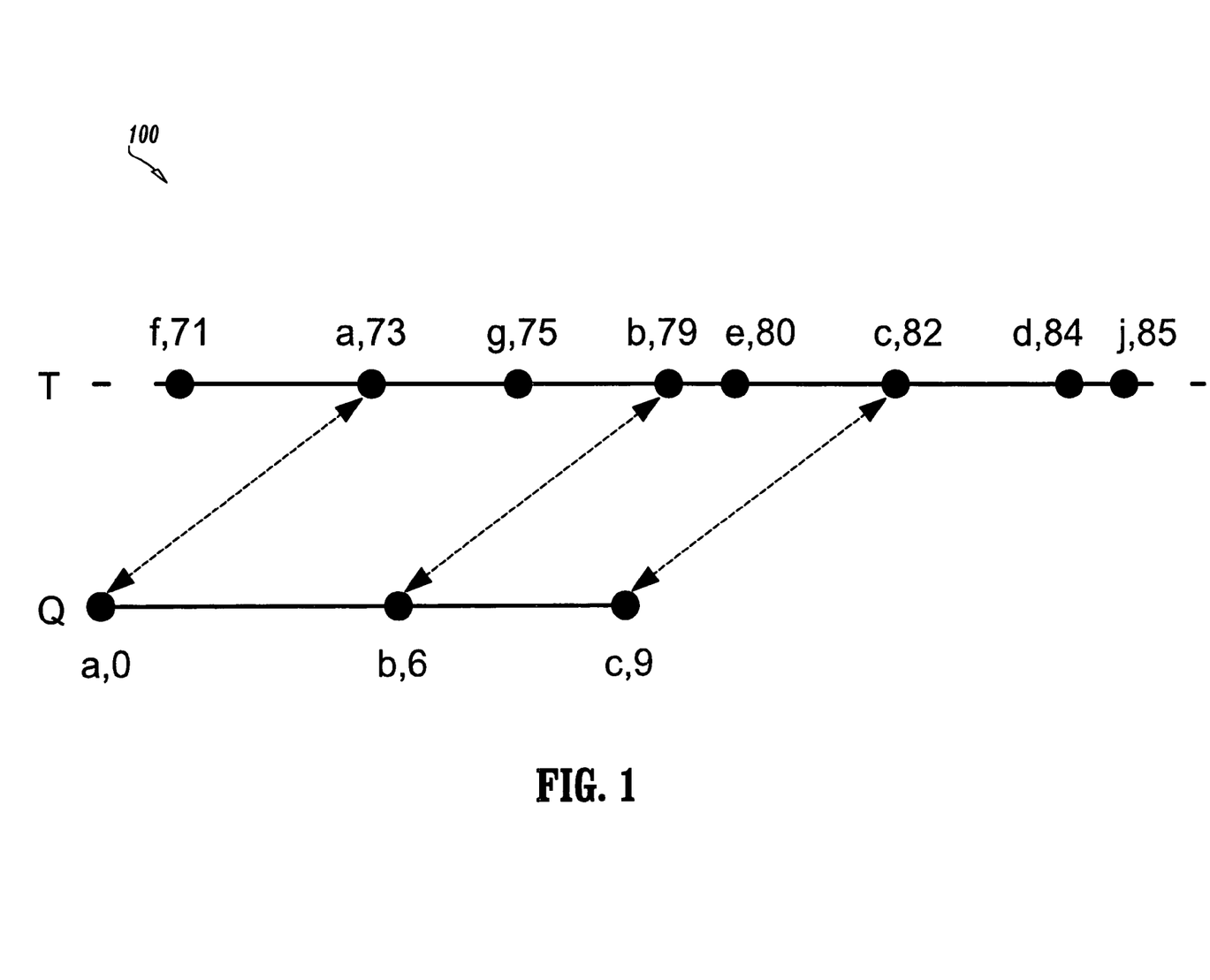
FIG. 1 shows a weighted-sequence matching, in accordance with one embodiment of the present invention.

An example of weighted-sequence matching 100 is shown in FIG. 1, where a query sequence ((a, 0), (b, 6), (c, 9)) matches a weighted-subsequence of T, ((a, 73), (b, 79), (c, 82)). Weighted-sequence matching requires that the weight difference between any two items in a matched subsequence is exactly the same as that of the corresponding items in the query sequence. This restriction can be relaxed to allow approximate matching.

Approximate Matching of Weighted-Sequences

Given a sequence T, a query sequence Q, and tolerance $e_i \geq 0, i \in 1, \ldots, |Q|$, it is said that Q "approximately matches" T if there exists a (non-contiguous) subsequence $T' \subset T$ such that $|Q|=|T'|$, $s(Q_i)=s(T'_i)$, and $|w(Q_i)-(w(T'_i)-w(T'_1))| \leq e_i$, $\forall i \in 1, \ldots, |Q|$.

The tolerances (i.e., $e_i$) given in a query must not disturb the order of the elements in a sequence. Otherwise, ambiguity may arise. In other words, it is required that $w(Q_i)+e_i<w(Q_{i+1})-e_{i+1}$, which guarantees that $Q_i$ precedes $Q_{i+1}$ in the presence of the tolerances.

An index structure for weighted-sequence matching will now be described, in accordance with one embodiment of the present invention. The symbols' (i.e., the first element in (symbol, weight) pair) frequency distribution in the sequence is taken into consideration.

An index structure known as an "iso-depth index" will now be described. The iso-depth index supports fast accesses of (non-contiguous) subsequences that match a query sequence. As used herein, the terms "iso-depth index" and "iso-depth structure" are used interchangeably.

The iso-depth structure embodies a compact index to all the distinct, non-empty sequences whose weight range is less than ξ, which is a window size provided by the user. For event sequences, a ξ is chosen such that two events separated by a gap longer than ξ are rarely correlated. However, there is always a possibility that a query needs to be broken down into multiple sub-queries.

Weights in sequences are usually represented by real numbers. They may be discretized into a number of equi-width or equi-depth units, depending on their distribution and application. This is because the set of real numbers have an innumerable amount of values. Since only fixed amount of values can be handled, the set of real numbers are discretized into a fixed number of bins. For instance, if the range of the values is from 0 to 100, 10 bins can be created and put values 10*i to 10*(i+1) to bin i. In this disclosure, it is assumed that the weights in the sequences are already discretized into equi-width units. The queries, as well as the tolerances associated with them, are discretized in the same way.

During the index construction, a trie is employed as an intermediary structure to facilitate the building of the iso-depth index. A trie is a common data structure used frequently in string indexing. A trie (short for "retrieval") is tree for storing strings in which there is one node for every common prefix. The strings are stored in extra leaf nodes. The trie is not used during query processing. Various approaches to build tries or suffix trees in linear time have been developed. For example, Ukkonen developed a linear-time, on-line suffix tree construction algorithm. See E. Ukkonen. Constructing suffix trees on-line in linear time. *Algorithms, Software, Architecture: Information Processing,* pages 484-92, 1992 (hereinafter referred to as the "Ukkonen algorithm"). The suffix tree only supports efficient matching of contiguous substrings. If a query string, implemented as a suffix tree, contains gaps (e.g., "abc*****def" where * represents any character), a subtree needs to be traversed under c for up to five levels to find all occurrences of d. The proposed iso-depth index structure enables a jump to such d's immediately without traversing the subtree. Thus, the iso-depth index supports efficient matching of non-contiguous subsequences.

An example of an iso-depth index structure, in accordance with one embodiment of the present invention will now be presented: Let a sequence database D be composed of the following symbol/weight pairs. Let window size ξ=16. D=(b, 6), (d,9), (a,11), (d,14), (a,17), (c,18), (b,23), (c,25), (d,28), (a,29), (c,30). The term "window size" refers to a user-provided parameter that indicates the maximum length of the subsequence chosen to index. For instance, for timestamped event sequences, it can be argued that events separated by an interval longer than a certain time period, say ten minutes, cannot have a causal relationship between them. Therefore, it is a moot point to index sequences longer than the ten minute interval. Accordingly, a ten minute window size can be set, which means that any subsequence whose length is less than ten minutes will be indexed.

Because queries are constrained by the windows size, only index subsequences $T \subset D$, where $\|T\|<ξ$. A moving window of size ξ over D is created. As the window is moved along D, the following subsequences in the window are found:

| $\mathcal{T}$ | $\|\mathcal{T}\|$ |
|---|---|
| (b, 6), (d, 9), (a, 11), (d, 14), (a, 17), (c, 18) | 14 |
| (d, 9), (a, 11), (d, 14), (a, 17), (c, 18), (b, 23) | 14 |
| (a, 11), (d, 14), (a, 17), (c, 18), (b, 23), (c, 25) | 14 |
| (d, 14), (a, 17), (c, 18), (b, 23), (c, 25), (d, 28), (a, 29) | 15 |
| ... | ... |

Next, a function $f$ is applied on each subsequence T in the above table. The function $f$ is encoded into a one dimensional sequence S:

$$f(<T_1, \ldots, T_k>) = <S_1, \ldots, S_k>$$

where:

$$S_i = \begin{cases} s(T_i) : i = 1 \\ s(T_i)_{w(T_i) - w(T_{i-1})} : i = 1 \end{cases}$$

The resulting one-dimensional sequences are shown below:

| $f(\mathcal{T})$ |
|---|
| $b_0, d_3, a_2, d_3, a_3, c_1$ |
| $d_0, a_2, d_3, a_3, c_1, b_5$ |
| $a_0, d_3, a_3, c_1, b_5, c_2$ |
| $d_0, a_3, c_1, b_5, c_2, d_3, a_1$ |
| ... |

Subscripts of symbols in a one-dimensional sequence represent intervals (i.e., weight differences) between two adjacent symbols in the original weighted sequence. Let $f(T)=S$. The weight range of T is the sum of the subscripts in S. That is, $\|T\| = \Sigma_{v_i \in S} i$.

Figure 2:
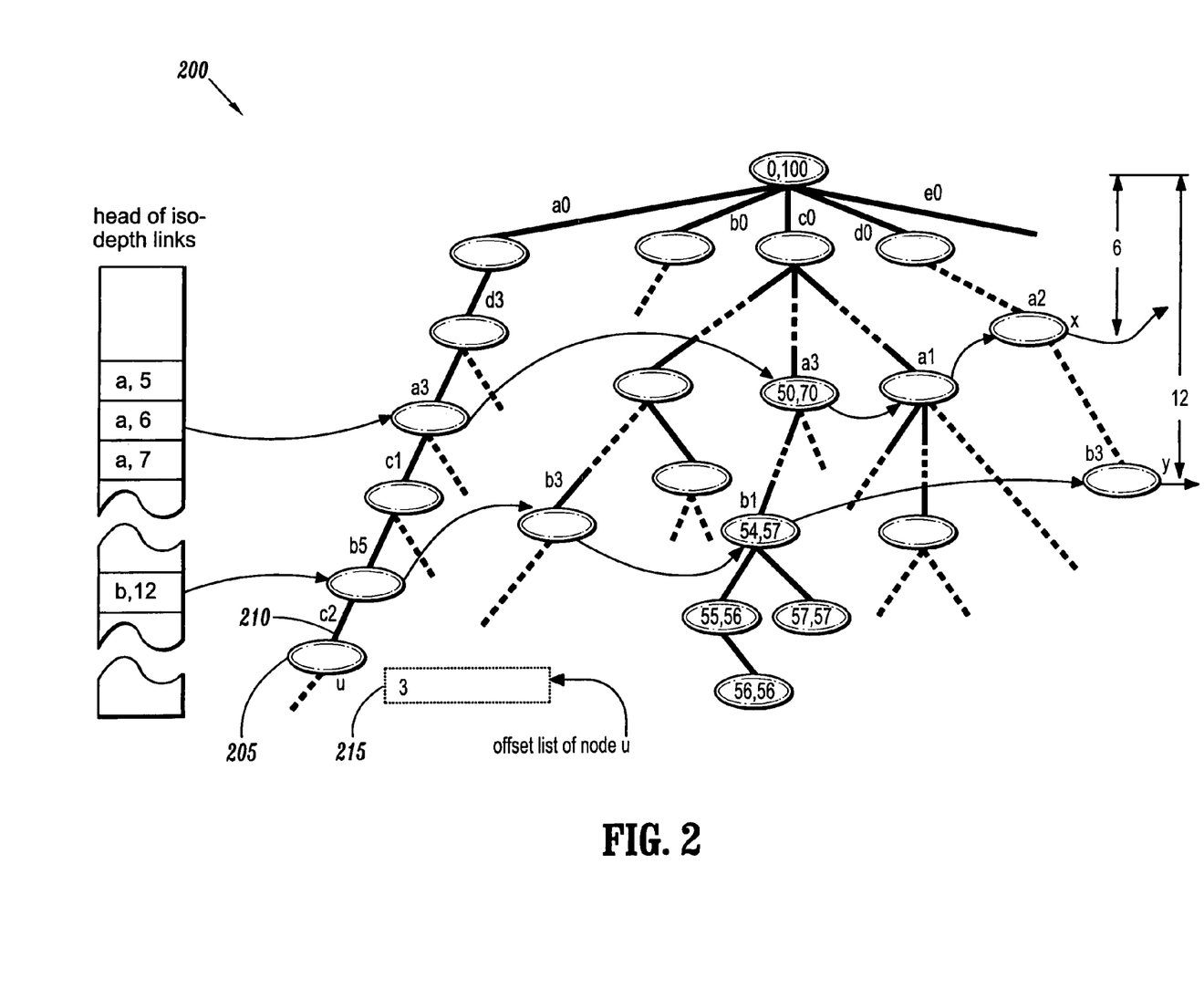
FIG. 2 shows an iso-depth structure, in accordance with one embodiment of the present invention.

The encoded sequences have an expanded symbol set. Let's take the third encoded sequence, for example. In $f(T)=<a_0, d_3, a_3, c_1, b_5, c_2>$, $a_0$ and $a_3$ are two different, independent symbols. The function $f(T)$ is inserted into a trie 200 by following the arcs in $f(T)$, as shown in FIG. 2. Each node in the trie has an offset list. Assuming the insertion of $f(T)$ leads to node u 205, which is pointed to by arc $c_2$ 210, appended to the offset list 215 of node u 205 is the position of T in the original sequence D. In this case, the position is 3 because T appears in the third window of D.

After all encoded sequences are inserted, sequential IDs (starting with 0, which is assigned to the root) are assigned to the tree nodes in the depth-first traversal order. In addition, for each node, the largest ID of its descendants is recorded. More specifically, as shown in FIG. 2, each node v is assigned a pair of labels $(v_s, v_m)$, where $v_s$ is the ID of node v and $v_m$ is the largest ID of v's descendent nodes. Based on the numbering, the ID of any descendent of v is between $v_s$ and $v_m$.

For a given node v, let $v_p$ be the path descending from the root to v. $\|v_p\|$ or simply $\|v\|$, denotes the distance between the root and v. $\|v\|$ can be derived by simply summing up the subscripts of the symbols in sequence $v_p$. As an example, for nodes x and y in FIG. 2, $\|x\|=6$ and $\|y\|=12$.

Next, iso-depth links are created for each (x, d) pair, where x is a symbol and d=1, ..., ξ. As each node is visited in depth-first order, each node is appended to an iso-depth link. The term "iso-depth link" refers to the horizontal links in the iso-depth structure. Assuming arc $x_k$ points to node v, v is appended to the iso-depth link for pair (x, $\|v\|$). Thus, an iso-depth link is composed of nodes that have the same distance from the root. As shown in FIG. 2, each node v, which are represented by pair $(v_s, v_m)$, appears in only one iso-depth link. The linked list implementation shown in FIG. 2 are for illustrative purposes only. For example, instead of linked lists, consecutive buffers (i.e., iso-depth buffers), $B^+$ trees, and the like may be used for efficient accesses.

As defined herein, iso-depth links have the following two properties:

(1) Nodes in an iso-depth link are sorted by there IDs in ascending order;

(2) A node's descendants that appear in an iso-depth link are contiguous in that link. More formally, let v ... w ... u be three nodes in an iso-depth link, in that order. If r is an ancestor of both v and u, then r is also an ancestor of w.

The proof for the two properties are shown below:

(1) Nodes are appended during the depth-first traversal when node IDs of increasing values are generated.

(2) Because r is an ancestor of v and u, it follows that $r_s < v_s \leq r_m$ and $r_s < u_s \leq r_m$. From $v_s < w_s < u_s$, it follows that $r_s < w_s < r_m$, which means that r is an ancestor of w.

The following algorithm summarizes the index construction procedure:

---
Algorithm 1: Index Construction
---
Input: D: weighted-sequence, ξ: window size
Output: F: index of D for all sequences T in moving window of size ξ do
    insert f (T) into a trie;
make a depth-first traversal of the tree;
for each node v encountered in the traversal do
    label node v b $(v_s, v_m)$;
    let $a_k$ be the tree arc that points to v;
    append $(v_s, v_m)$ to iso-depth list (a, $\|v\|$);
index file F contains two parts:
▷ iso-dept links (as consecutive buffers), where a node v is represented by a pair $(v_s, v_m)$;
▷ offset list L [0 ... m] for node 0 ... m, where m is the largest node ID.

---

The construction is of time complexity O(n). The well-known Ukkonen algorithm builds a suffix tree in linear time. The construction of the trie used for iso-depth indexing, as presented herein, is less time consuming than the Ukkonen algorithm because the length of the subsequences inserted in the trie is constrained by ξ (i.e., the window size). Thus, a brute-force algorithm, as is well-known to those skilled in the art, may be used to construct the trie with limited main memory, and to merge the trie to a disk-resident tree structure periodically.

As previously stated, although not so limited, the iso-depth links are depicted as linked lists for the sake of simplicity. In actuality, the $(v_s, v_m)$ pairs in an iso-depth link are stored consecutively in an array (i.e., an iso-depth array). Because v (i.e., IDs of node v) are in ascending order (i.e., property number 1, as described above), by storing them consecutively in an array, it follows that a binary search can be used to locate nodes whose IDs are within a given range.

Figure 3:
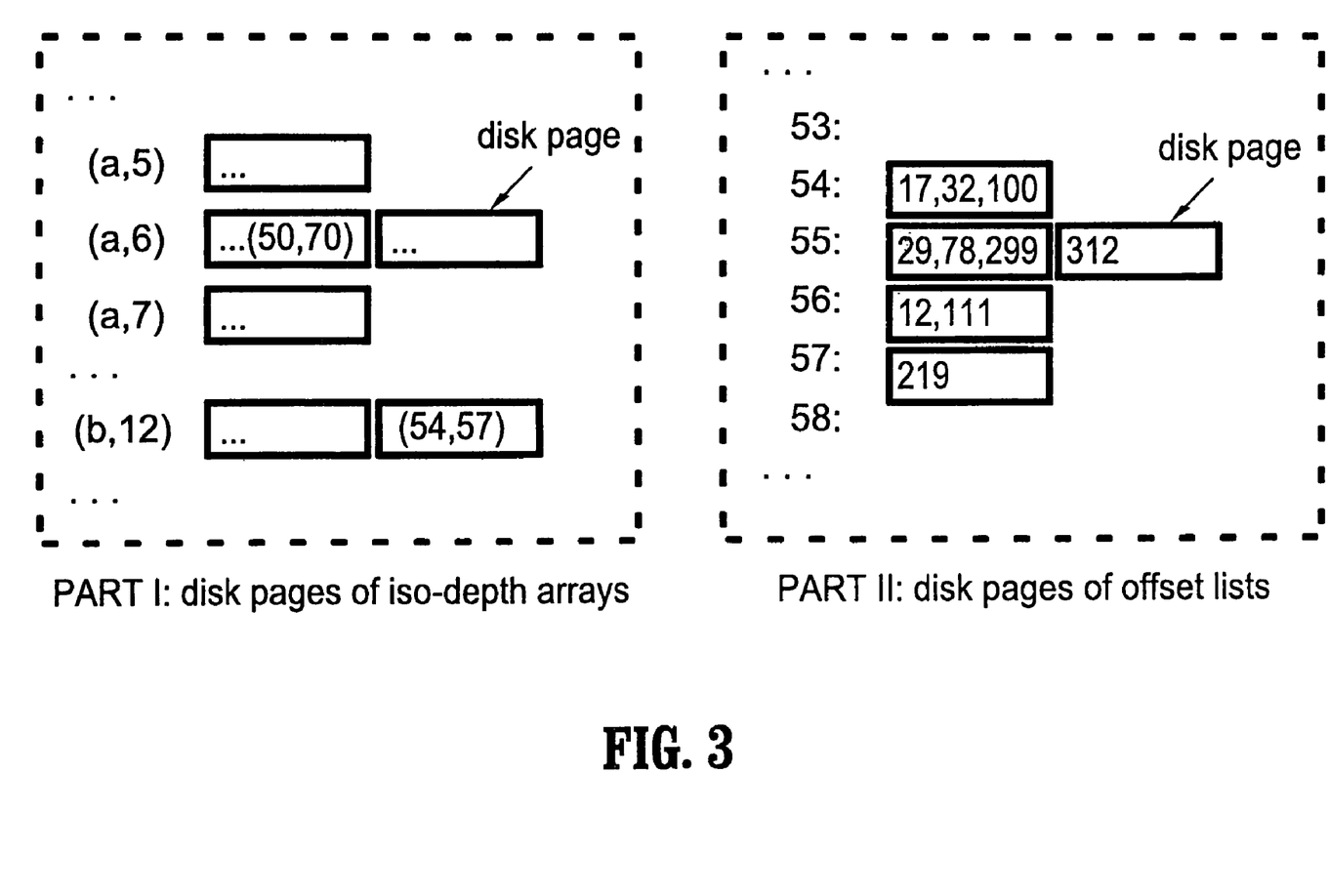
FIG. 3 shows iso-depth arrays, in accordance with one embodiment of the present invention.

The secondary index is composed of two major parts: (1) arrays (i.e., iso-depth arrays) of $(v_s, v_m)$ pairs for iso-depth links; and (2) offset lists. As shown in FIG. 3, the iso-depth arrays are organized in ascending order of (symbol, weight).

The offset lists are organized in ascending order of node IDs. Both of the structures are one-dimensional buffers, which are straightforward to implement for disk paging. It should be noted that the tree structure (i.e., parent-child links) are not stored in the index. As explained in greater detail below, the index structure contains complete information for efficient subsequence matching.

The space taken by the secondary index is linearly proportional to the size of the data sequence. Let D be a sequence of length n. Since each trie node appears once and only once in the iso-depth links, the total number of entries in Part 1 equals the total number of nodes in the trie, or $O(\xi(n))$ for the worst case (i.e., if none of the nodes are shared by any two subsequences). On the other hand, there are exactly n offsets stored in Part II. Thus, the space is linearly proportional to n.

During index construction, once the nodes of the trie have been labeled, no further insertion or deletion is allowed. To update the index for newly arrived data sequences, a new trie is built. The nodes of the trie are labeled with numbers starting from n+1, where n is the largest ID assigned to the nodes of the previous tries. The labels of the nodes in the new trie are then appended in the secondary iso-depth buffers. Periodically, the secondary index can be compacted by recursively merging nodes starting from the root nodes of the tries.

It will now be shown how to find non-contiguous subsequence matches using the iso-depth structure.

Suppose we have the following query sequence Q=<(c, 0), (a, 6), (b, 12)>. We start with node (c, 0), which has only one pair of labels. Let us assume the label is [20, 200], which means that sequences starting with symbol c are indexed by nodes from 20 to 200. Then, we consult iso-depth buffer (a, 6), which contains all the nodes of a that are 6 units away from the root. However, we are only interested in those nodes that are descendants of (c, 0). According to the properties of the iso-depth structure, as previously explained in greater detail, those descendants are contiguous in the iso-depth link and their ID∈[20,200]. Because the nodes in the buffer are organized in ascending order of their IDs, it follows that the search is carried out as a range query in log time. Suppose we find three nodes, u=[42, 61], v=[88, 99], and w=[102, 120], in that range. Then, we repeat the process for each of the three nodes in iso-depth buffer (b, 12). Assume in the iso-depth buffer of (b, 12), node x is a descendent of node u, node y is a descendent of node v, and none are descendants of node w. We now have matched all the symbols in Q, and the offset lists of nodes x, y and their descendants contain offsets for the query sequence Q. Assuming x=[53, 55] and y=[97, 98], we find in Part II the offset lists of nodes 53, 54, 55, 97, and 98. These are the offsets in the data sequence where subsequence Q occurs.

For approximate matching, we might need to consult multiple iso-depth buffers for each symbol in the query. For instance, let's assume the above query Q comes with error tolerance $e_1=1$, $e_2=1$. To match the second symbol, instead of consulting iso-depth array (a, 6) alone, we need to consult iso-depth array (a,j), where $6-e_1 \leq j \leq 6+e_1$, or more specifically, (a, 5), ((a, 6) and (a, 7), to find nodes whose ID∈[20, 200]. We repeat this process for the rest of the symbols in the query.

The algorithm below presents the outline of searching a given weighted subsequence in an index file:

---
Algorithm 2: Subsequence Matching

Input : Q: query sequence, $e_1, \ldots, e_{|Q|}$: tolerance
Output: offsets in D where Q occur Let Q = ((q_1, 0), ..., (q_1, w_i), ...);
v ← root's child node under arc $q_1$;
search (v, 1);

Funchtion search(v, i)
if i < |Q| then
    i ← i + 1;
    for each iso-depth link I = ($q_i$, j), $w_i - e_i \leq j \leq w_i + e_i$ do
        /* Perform binary search in I to find nodes ε [$v_s$, $v_m$] */
        for each node r ε i whose id ε[$v_s$, $v_m$] do
            search (r, i);
        end
    end
else
    output L [$v_s \ldots v_m$], offset lists of node v and all nodes under v;
end

---

The algorithm (i.e., Algorithm 2) first consults iso-depth links, then it returns offsets in the offset lists. It shows that iso-depth links contain complete information for subsequence matching.

The index structure discussed in the previous section does not take into account the occurrence frequency of different symbols. In real-life event logs of network management systems, certain events may occur much more frequently than others. A close study reveals that the frequency of the events follows a Zipf-like distribution. Zipf's law states that the frequency count of the r-th ranked event is inversely proportional to the rank:

$$freq \sim r^{-b}$$

with exponent b close to unity (i.e., the value 1.0).

This phenomenon poses a problem for weighted-subsequence matching. Rare events are usually of more interest and they occur frequently in queries. Imagine we have a query Q=<(a, 0), (b, 10), (c, 20)>, and a, b are the most common events in the data set, while c is the least common one. Starting with event a, we often need to examine a large amount of nodes, although only few of them finally lead to c. It is more desirable if subsequence matching starts with the least frequent symbol. As explained in greater detail below, the problem can be solved by preprocessing the sequences before they are inserted into the trie, and preprocessing the query sequences before we start sequence matching.

Le A be the symbol set and let rank(a) denote the (reverse) frequency rank of symbol a∈A. That is, the least frequent symbol is ranked 0 and the most frequent symbol is ranked |A|−1. We convert sequence T to sequence T' by mapping element (x, w)∈T to element (x, w')∈T', where w'=rank(x)× 2ξ+w, and we sort the elements in T' in ascending order by their new weights. Intuitively, elements in a window of size ξ are distributed to a window of size no larger than 2ξ|A| so that in the new window, less frequent symbols always precede more frequent ones.

We place a moving window of size on and index the sequence in the window. Assume the following sequence is in a window on T':

$$V=<(x, w'), \ldots, (y, u'), \ldots>$$

Consider (x, w') the first element of the above sequence, and any other element. If the two elements are more than ξ apart in the original sequence T, that is, (y, u') is removed from V. This is because queries are restricted by length ξ. Thus, there is no need to index elements more than apart from each other. After filtering out such elements, the sequence of the remaining elements are inserted into the trie.

The above process will now be demonstrated by an example. Suppose we have a total of 3 symbols, a, b, and c, with descending frequency rates: rank(a)=2, rank(b)=1, and rank(c)=0. We are given the following data sequence T, with window size ξ=20.

$$T=<(a, 1)(b, 8)(c, 19)(b, 48)(a, 66)>$$

We derive T' from T by changing (x, u) to (x, rank(x)×2ξ+ u). We order elements in T' by their new weights. (The old weights are shown as subscripts for illustrative purposes.)

$$T'=<(c, 19_{19}), (b, 48_8)(a, 81_1)(b, 88_{48}), (a, 146_{66})>$$

We place a moving window of size 2|A|ξ=120 on T'. The table below lists each sequence in the moving window.

| | moving window of size 120 | after removing elements | after applying f( ) |
|---|---|---|---|
| $V_1$ | <(c, $19_{19}$), (b, $48_8$), (a, $81_1$), (b, $88_{48}$)> | <(c, 19), (b, 48), (a, 81)> | $c_0, b_{29}, a_{33}$ |
| $V_2$ | <(b, $48_8$), (a, $81_1$), (b, $88_{48}$), (a, $146_{66}$)> | <(b, 48), (a, 81)> | $b_0, a_{33}$ |
| $V_3$ | <(a, $81_1$), (b, $88_{48}$), (a, $146_{66}$)> | <(a, 81)> | $a_0$ |
| $V_4$ | <(b, $88_{48}$), (a, $146_{66}$)> | <(b, 88), (a, 146)> | $b_0, a_{58}$ |

Underlined elements in the above table are removed. For instance, (b, $88_{48}$) in $V_2$ is removed because its distance (in the original sequence T) to the first element of $V_2$, (b, $48_8$), is |48−8|=40, which is larger than ξ=20.

Given a query Q, we convert it to Q' using the same process. For instance, let Q=<(a, 0), (b, 7), (c, 18)>. After deriving Q'=<(c, 18), (b, 47), (a, 80)>, we search for $f(Q')=c_0, b_{29}, a62$ in the trie. One match is found since $c_0, b_{29}, a_{33}$ has been inserted.

By using the sequence reordering process, we always start sequence matching by the least frequent symbol in the query. It has the potential of saving disk accesses because c→b is much rarer than a→b, given that a and b occur more frequently than c. The expression "a→b" means that the search of symbol a is followed by the search of symbol b. That is, a and b are two adjacent elements in the query sequence, so we search a first and then b.

More formally, the trie constructed for T' has the following properties:
1. Elements of the inserted sequences are ordered by ascending symbol frequency rate.
2. The trie for T' indexes all the subsequences (with length ≤ξ) in T.

The proof for the above properties is as follows:
1. Assume V=<(x, w'), ..., (y, u'), ..., (z, v'), ...> is an inserted sequence. We have |u−w|≤ξ and |v−w|≤ξ, from which we get v−u<2ξ. Because V is a weighted sequence, it follows that u'≤v', and $$\text{rank}(y)*2\xi+u \leq \text{rank}(z)*2\xi+v$$

$$\text{rank}(y) - \text{rank}(z) \leq \frac{v-u}{2\xi} < 1$$

which means symbols in V are in ascending order of frequency rate.

2. Assume V is a subsequence of T, ‖V‖<ξ, and V' is converted from V by the process described above. Let (x, u'), (y, v') be any two of the elements of V'. We have $$v' - u' = (\text{rank}(y)*2\xi+v) - (\text{rank}(x)*2\xi+u) \leq (2\xi|A|-1) + v - u < 2\xi|A|$$

which means V' is inside a moving window of size 2ξ|A|. Because ‖V‖<ξ, any two elements of V are less than ξ apart, so none of them will be removed before they are inserted into the trie.

Because reordering does not increase the length of the data sequence (|T|=|T'|), the number of subsequences inserted into the trie is the same. However, the average number of elements in the subsequences might be different. As a matter of fact, two elements in subsequence V inside a moving window can be 2ξ apart in the original sequence (both elements are at most ξ apart from the first element of V). This has the potential to double the size of the trie. However, reordering also increase the chances of path sharing.

The present disclosure identifies a new challenge in sequence matching: indexing weighted-sequences for efficient retrieval. It generalizes the well-known string matching problem by giving each element in the sequence a weight The distance between two elements in a sequence is measured by their weight difference, instead of their relative positions in the sequence. In numerous applications, such weight differences are of great interest. Event management systems, for instance, record millions of timestamped events on a daily basis. The elapsed time (i.e., weight difference) among different events can often provide actionable insights for such systems.

Proposed herein is an iso-depth index for fast retrieval of weighted-subsequences in large datasets. Experimental results have shown that the iso-depth index achieves orders of magnitude speedup over alternative algorithms based on naive indexing and linear scan. The method is also resilient to non-uniform frequency distribution of elements. The query performance is improved by reordering elements in subsequences (according to their occurrence rate) during indexing so that matching can start from the least frequent element in the query.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of generating an index for a sequence that supports a non-contiguous subsequence match, comprising:
   receiving a sequence comprising one or more pairs of symbol and weight elements, the symbol elements corresponding to a non-uniform frequency distribution;
   receiving a window size;
   encoding the sequence into a weighted-sequence;
   encoding the weighted sequence into one or more one-dimensional sequences, wherein the length of each of the one or more one-dimensional sequences is less than the window size;
   reordering the one or more one one-dimensional sequences using the non-uniform frequency distribution to generate a new sequence;
   inserting the new sequence as one or more trie nodes into a trie structure; and
   generating an index, wherein generating the index comprises:
      generating a current sequential ID and a maximum sequential ID pair for each of the one or more trie nodes, wherein the current sequential ID of any descendant of a given the node of the one or more trie nodes is between the current sequential ID of the given trie node and the maximum sequential ID;
      generating an iso-depth link for each unique symbol in each of the one or more one-dimensional sequences, wherein the iso-depth link comprises trie nodes under the symbol; and
      generating an offset list comprising an original position for each of one or more subsequences in the weighted-sequence.

2. The method of claim 1, wherein encoding the sequence into the weighted-sequence comprises encoding the sequence with weights represented by real numbers.

3. The method of claim 2, wherein encoding the sequence with weights represented by real numbers comprises discretizing the sequence into a number of equi-width units.

4. The method of claim 1, wherein inserting the new sequence into the trie structure is performed using a depth-first traversal.

5. The method of claim 1, further comprising creating a weighted-sequences index, wherein the weighted-sequences index comprises an iso-depth index, wherein the iso-depth index is a one-dimensonal buffer.

6. The method of claim 1, further comprising creating a weighted-sequences index, wherein the weighted-sequences index comprises an iso-depth index, wherein the iso-depth index is a B+ tree.

7. The method of claim 1, further comprising creating a weighted-sequences index, wherein the weighted-sequences index comprises an iso-depth index, wherein the iso-depth index is a linked list.

8. The method of claim 1, wherein the reordering comprises:
   (a) adding an offset 2*w*r to each of the weight elements to generate a new weight, wherein w is a window size, and r is a frequency rank, for a symbol of each of the symbol elements;
   (b) sorting the pars of symbol and weight elements by the new weight;
   (c) placing a moving window of size 2*w*A on the new sequence, wherein A is a total number of the symbols; and
   (d) indexing the new sequence in a new window.

9. The method of claim 1, wherein receiving the sequence comprises receiving one or more scientific datasets, transforming each of the one or more scientific datasets into one or more sequences, and concatenating the one or more sequences to form a long sequence.

10. A program storage device readable by machine, tangibly embodying a program of instructions executable by the machine to perform method steps for generating an index for a sequence that supports a non-contiguous subsequence match, the method steps comprising:
    receiving a sequence comprising one or more pairs of symbol and weight elements, the symbol elements corresponding to non-unifom frequency distribution;
    receiving a window size;
    encoding the sequence into a weighted-sequence;
    encoding the weighted sequence into one or more one-dimensional sequences, wherein the length of each of the one or more one-dimensional sequences is less than the window size;
    reordering the one or more one one-dimensional sequences using the non-uniform frequency distribution to generate a new sequence;
    inserting the new sequence as one or more trie nodes into a trie structure; and
    generated an index, wherein generating the index comprises:
       generating a current sequential ID and a maximum sequential ID pair for each of the one or more trie nodes, wherein the current sequential ID of any descendant of a given trie node of the one or more trie nodes is between the current sequential ID of the given trie node and the maximum sequential ID;
       generating an iso-depth link for each unique symbol in each of the one or more one-dimensional sequences, wherein the iso-depth link comprises trie nodes under the symbol; and
       generating an offset list comprising an original position for each of one or more subsequences in the weighted-sequence.

11. The program storage device of claim 10, wherein the instructions for encoding the sequence into the weighted-sequence comprise instructions for encoding the sequence with weights represented by real numbers.

12. The program storage device of 11, wherein the instructions for encoding the sequence with weights represented by real numbers comprise instructions for discretizing the sequence into a number of equi-width units.

13. The program storage device of claim 10, wherein inserting the new sequence into the trie structure is performed using a depth-first traversal.

14. The program storage device of claim 10, further comprising instructions for creating a weighted-sequences index, wherein the weighted-sequences index comprises an iso-depth index, wherein the iso-depth index is a one-dimensional buffer.

15. The program storage device of claim 10, further comprising instructions for creating a weighted-sequences index, wherein the weighted-sequences index comprises an iso-depth index, wherein the iso-depth index is a B$^+$ tree.

16. The program storage device of claim 10, further comprising instructions for creating a weighted-sequences index, wherein the weighted-sequences index comprises an iso-depth in index, wherein the iso-depth index is a linked list.

* * * * *